(12) United States Patent
Sato

(10) Patent No.: US 12,132,874 B2
(45) Date of Patent: Oct. 29, 2024

(54) INFORMATION PROCESSING APPARATUS THAT TRANSMITS REQUESTS WITH TRANSMISSION-SOURCE INFORMATION ACCORDING TO ORDER INFORMATION, INFORMATION PROCESSING METHOD, AND MEDIUM

(71) Applicant: CANON KABUSHIKI KAISHA, Tokyo (JP)

(72) Inventor: Masaaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/491,855

(22) Filed: Oct. 23, 2023

(65) Prior Publication Data
US 2024/0155063 A1 May 9, 2024

(30) Foreign Application Priority Data

Nov. 8, 2022 (JP) .................................. 2022-179091

(51) Int. Cl.
*H04N 1/00* (2006.01)
*G06F 3/12* (2006.01)

(52) U.S. Cl.
CPC ......... *H04N 1/00464* (2013.01); *G06F 3/121* (2013.01); *G06F 3/1234* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 11,210,156 B1* | 12/2021 | Liu | ...................... | G06F 11/0739 |
| 11,240,318 B1* | 2/2022 | Locketz | ................... | H04L 67/56 |
| 2003/0137693 A1* | 7/2003 | Nishio | ................... | H04L 69/329 |
| | | | | 358/1.15 |
| 2004/0114175 A1* | 6/2004 | Cherry | ..................... | H04L 67/02 |
| | | | | 358/1.14 |
| 2005/0278639 A1* | 12/2005 | Becker | ..................... | G06F 21/10 |
| | | | | 715/741 |
| 2016/0100021 A1* | 4/2016 | Nakamura | ............... | H04L 67/02 |
| | | | | 704/206 |
| 2017/0011448 A1* | 1/2017 | Agrawal | ........... | G06Q 20/40145 |
| 2023/0161663 A1* | 5/2023 | Rao | .......................... | H04L 69/40 |
| | | | | 714/18 |

FOREIGN PATENT DOCUMENTS

JP 2002236641 A 8/2002

* cited by examiner

*Primary Examiner* — Akwasi M Sarpong
*Assistant Examiner* — Pawan Dhingra
(74) *Attorney, Agent, or Firm* — Venable LLP

(57) ABSTRACT

An information processing apparatus stores one or more pieces of transmission-source information as transmission-source information for the requests; transmits, to the server, a request in which one of the one or more pieces of transmission-source information stored is set; receives a response to the request from the server; and in a case where a response indicating improperness of the request is received from the server in response to the request, transmits, to the server, the request in which, from among the one or more pieces of transmission-source information, the transmission-source information that was not used in the transmitted request is selected and set as the transmission-source information.

10 Claims, 8 Drawing Sheets

FIG. 6A

| No | User Agent |
|---|---|
| 1 | Mozilla/z.z (unique-id-xxx) BrowserEngine |
| 2 | Mozilla/z.z (iPhone) BrowserEngine |

| URL | User Agent |
|---|---|
| http://xxx.yyy.zzz | Mozilla/z.z (iPhone) BrowserEngine |

6006　　　　　　　　　　　　　　　　6007

INFORMATION PROCESSING APPARATUS THAT TRANSMITS REQUESTS WITH TRANSMISSION-SOURCE INFORMATION ACCORDING TO ORDER INFORMATION, INFORMATION PROCESSING METHOD, AND MEDIUM

BACKGROUND OF THE INVENTION

Field of the Invention

For example, the present invention relates to an information processing apparatus including a browser, an information processing method, and a medium.

Description of the Related Art

Some multi-function peripherals (MFP; hereinafter "image forming apparatus"), which typically include a scanner and a printer, include a web browser. The web browser sets a user agent in a request to be transmitted to a server. For example, the user agent is information indicating the type and version of the web browser and an operating system (OS) on the client. Based on the received user agent, the server returns a web-content response for constructing and displaying screen information.

In recent years, it has also become popular to set, in the user agent, information unique to the apparatus in which the web browser is included. Convenience is improved by the server returning a web-content response for constructing and displaying screen information that is unique to the apparatus and that matches the user agent passed to the server (see Japanese Patent Laid-Open No. 2002-236641). Furthermore, the server that the web browser works in coordination with is typically a cloud service. A cloud service provides services by linking a plurality of servers (hereinafter "server").

When the web browser transmits a request including information unique to the apparatus as the user agent, the server receiving the request may determine that the user agent is unsupported. In such a case, the server returns an empty web-content response. The web browser displays the empty web content as a blank screen. The user can neither obtain information from the access-destination server nor transition to another screen. In the case of a personal computer or the like, access can be attempted using another web browser; however, in the case of an image forming apparatus, the user would have to give up accessing the server from the image forming apparatus because an image forming apparatus usually does not include a plurality of types of web browsers. In such a manner, depending on the user agent set in the request, compatibility with the server may be lost, leading to a significant decrease in usability.

SUMMARY OF THE INVENTION

The present invention improves usability by maintaining the compatibility between a web browser and a server as much as possible.

The present invention has the following configuration. According to one aspect of the present invention, provided is an information processing apparatus that transmits requests to a server and receives responses to the requests, the information processing apparatus comprising: at least one memory storing at least one program; and at least one processor, the at least one program causing the at least one processor to: store one or more pieces of transmission-source information as transmission-source information for the requests; transmit, to the server, a request in which one of the one or more pieces of transmission-source information stored is set; receive a response to the request from the server; and in a case where a response indicating improperness of the request is received from the server in response to the request, transmit, to the server, the request in which, from among the one or more pieces of transmission-source information, the transmission-source information that was not used in the transmitted request is selected and set as the transmission-source information.

According to the present invention, usability can be improved by maintaining the compatibility between a web browser and a server as much as possible.

Further features of the present invention will become apparent from the following description of exemplary embodiments with reference to the attached drawings.

BRIEF DESCRIPTION OF THE DRAWINGS

FIG. 6A is a diagram illustrating one example of a user-agent management table.

FIG. 6B is a diagram illustrating one example of a priority management table.

DESCRIPTION OF THE EMBODIMENTS

Figure 1:
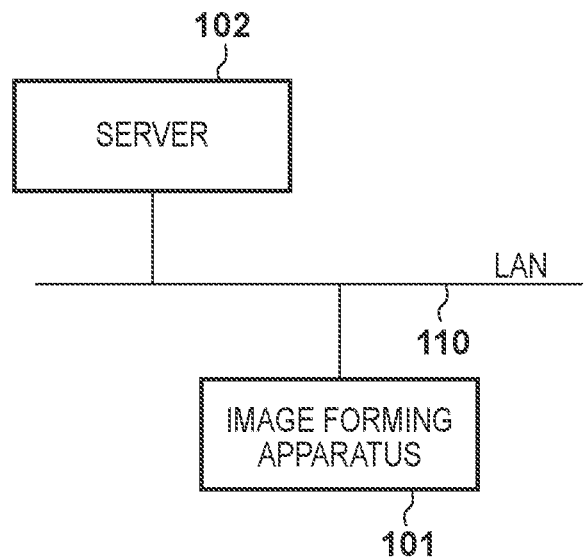
FIG. 1 is an overall view of an image processing system in an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image forming apparatus according to an embodiment of the present invention will be described. FIG. 1 is an overall view of an image processing system in a first embodiment. In a network 110, an image forming apparatus 101 and a server 102 are communicably connected to one another via a LAN 110. In a cloud service, the server 102 includes a plurality of servers that work in coordination to provide services; nevertheless, the term "server 102" is used in the present embodiment. In other words, the server 102 may include a plurality of servers.

Figure 2:
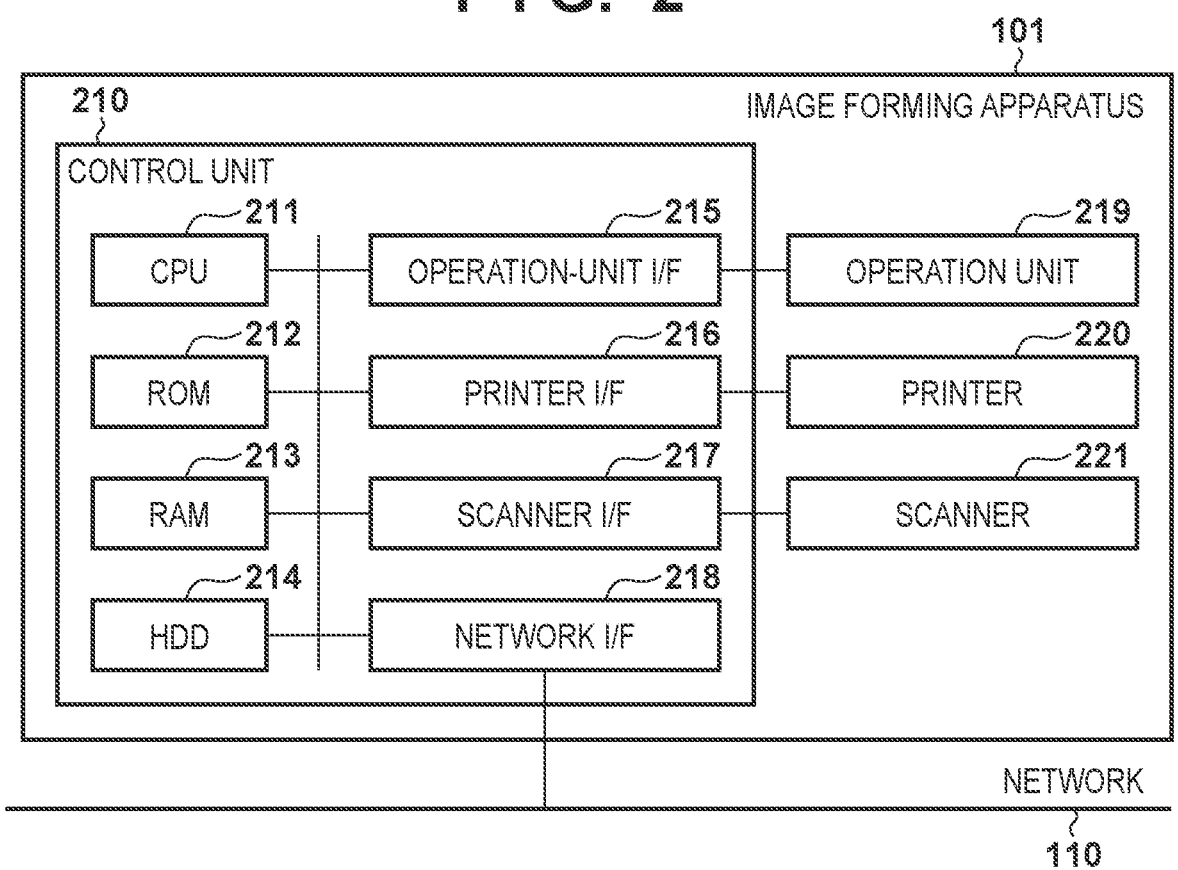
FIG. 2 is a block diagram illustrating a configuration of an image forming apparatus 101 in the embodiment of the present invention.

FIG. 2 is a block diagram illustrating a configuration of the image forming apparatus 101. Focusing on the image processing- and information processing-capabilities thereof, the image forming apparatus 101 in the present embodiment may also be called an image processing apparatus or an information processing apparatus.

A control unit 210 including a CPU 211 controls the operation of the entire image forming apparatus 101. The CPU 211 reads control programs stored in a ROM 212 and executes various types of control processing such as reading control and transmission control. The processing in the later-described flowcharts is also executed by the CPU 211. A RAM 213 is used as a main memory of the CPU 211 and as a temporary storage area, such as a work area, of the CPU 211. An HDD 214 stores image data and various programs.

An operation-unit I/F 215 connects an operation unit 219 and the control unit 210. The operation unit 219 includes a liquid-crystal display unit having a touch-panel function, a keyboard, and the like. The operation unit 219 provides a user interface, and, for example, displays screens that are acquired by a web browser from the server, and allows operations to be performed on the screens. Note that a web browser may also be called a web client.

A printer I/F 216 connects a printer 220 and the control unit 210. Image data to be printed by the printer 220 is transferred from the control unit 210 to the printer 220 via the printer I/F 216, and is printed on a recording medium by the printer 220.

A scanner I/F 217 connects a scanner 221 and the control unit 210. The scanner 221 generates image data by reading an image on a document, and inputs the image data to the control unit 210 via the scanner I/F 217.

A network I/F 218 connects the control unit 210 to the network 110. When a user uses a web browser 300 displayed on the operation unit 219 and designates a URL address of a connection destination that the user would like to access, the network I/F 218 transmits a request (HTTP request) to the destination designated by the URL. Note that, in the present example, the destination designated by the URL is the server 102, which is an external apparatus on the network 110.

Upon receiving the request, the server 102 returns a corresponding web-content response to the web browser 300. The web-content response is typically described using HTML, CSS, JavaScript, or the like. The web browser 300 converts the web content acquired from the server 102 into an input field, etc. (this conversion is commonly called browser rendering processing or the like). The web browser 300 displays the result of the rendering on the operation unit 219.

Specific Example of Problem

Figure 7A:
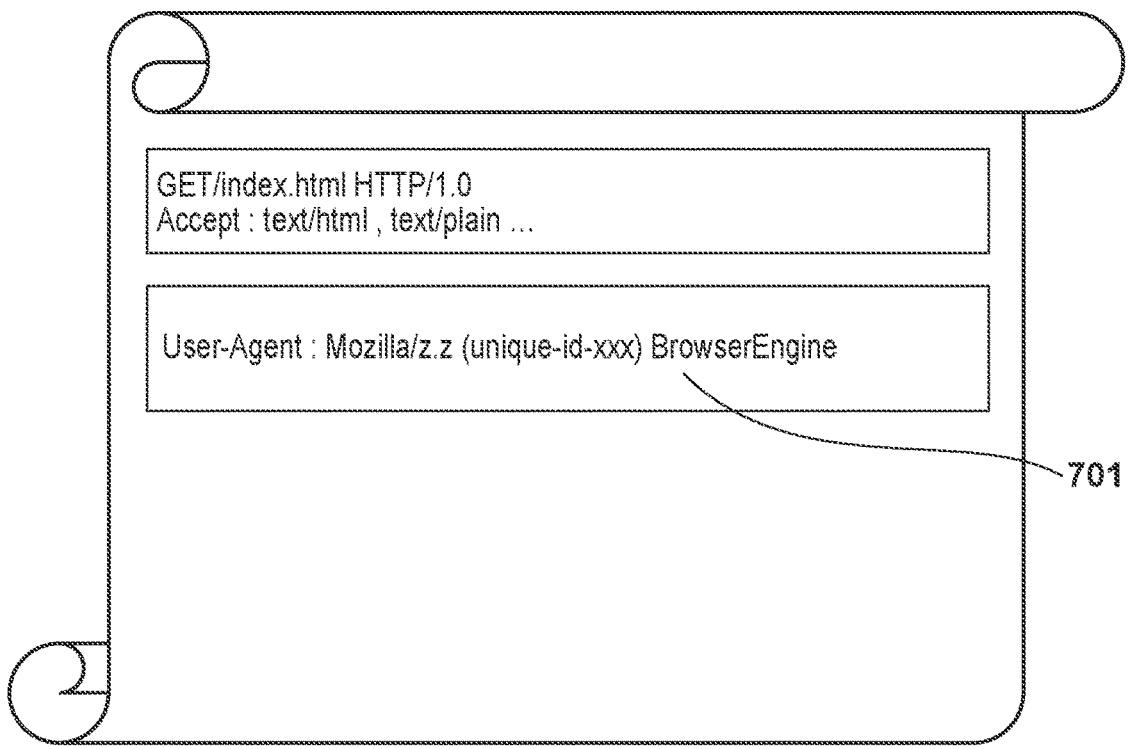
FIG. 7A is an image diagram of a request.

A specific example will be described of the process from when the web browser 300 transmits a request to when the web browser 300 displays a screen, which has been described as a problem above. FIG. 7A is an image diagram of a request transmitted by the web browser 300. A header portion of the request includes a description of a user agent. The user agent is information relating to the web browser that is the transmission source of web requests and an operating system (OS) in which the web browser is installed; for example, the user agent may indicate the type of the web browser and OS, etc. The request in FIG. 7A is a request in which information unique to the apparatus (unique-id-xxx) is set in a user agent 701.

Figure 7B:
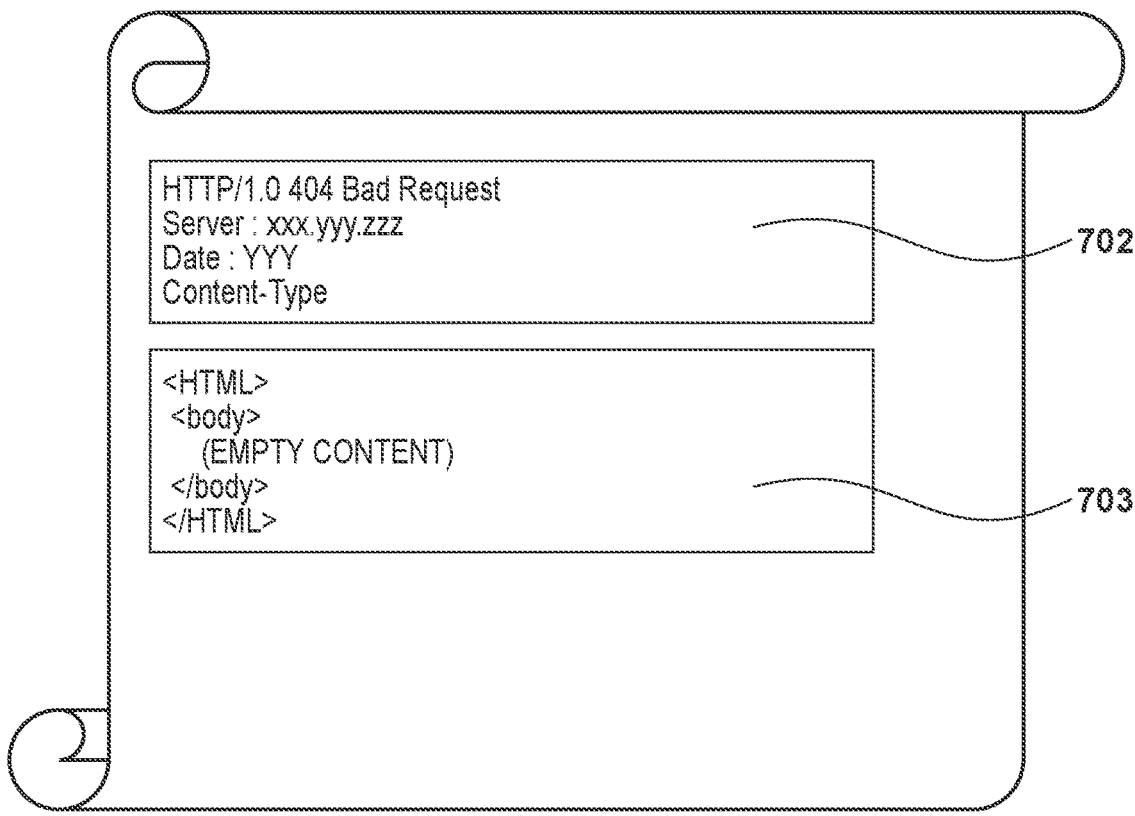
FIG. 7B is a diagram illustrating one example of a response.

FIG. 7B is a diagram illustrating one example of a web-content response returned by the server 102. FIG. 7B indicates that web content 703 is empty. Alternatively, the returned content may also be determined as being empty if an HTTP response code 702 is "404 Bad Request" (improper request). Upon determining that the user agent 701 included in the request indicates a user agent that is not supported by the server 102, the server 102 returns, to the web browser, the empty response 703 and/or the code indicating an improper request. A user agent that is not supported by the server 102 is a user agent that the server 102 is not compatible with. Furthermore, an empty response, in addition to the 404 response code, may be referred to as an "improper-request response".

Figure 8A:
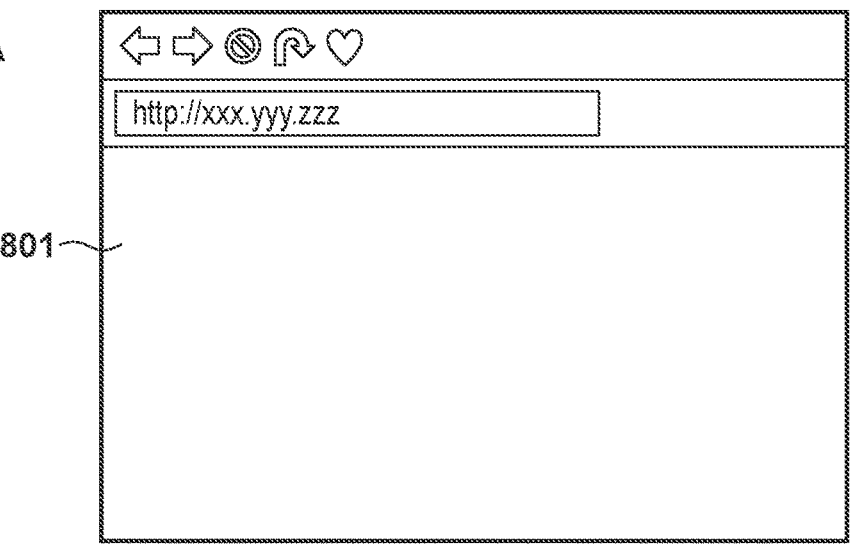
FIGS. 8A, 8B, and 8C are diagrams illustrating examples of displayed web content.

FIG. 8A is an image diagram of a web-content rendering result that the web browser 300 displays on the liquid-crystal display unit. FIG. 8A indicates that an empty web-content display area 801 is displayed because the web content 703 is empty.

Software of Image Forming Apparatus 101

Figure 3:
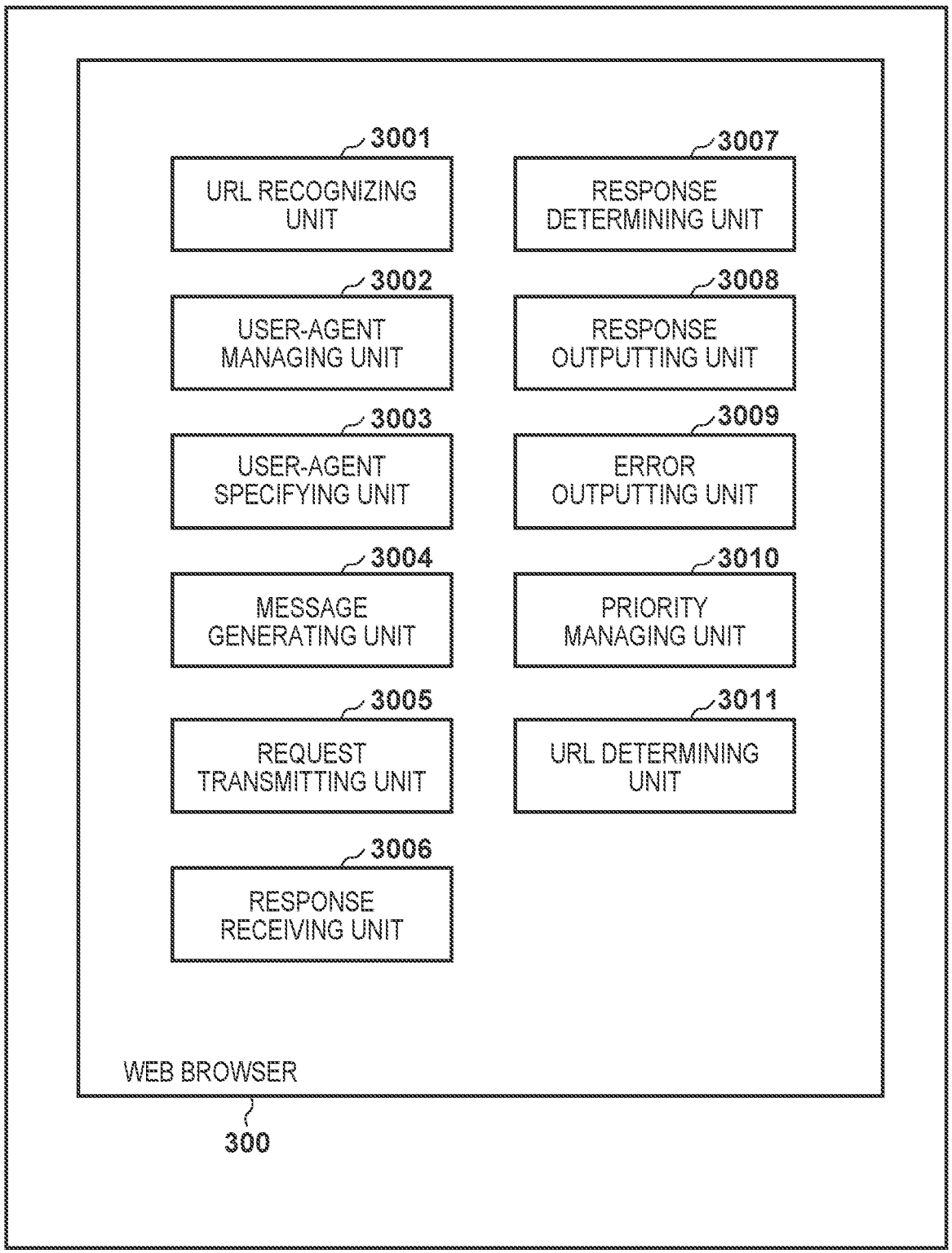
FIG. 3 is a software configuration diagram of the image forming apparatus 101.

FIG. 3 is a configuration diagram of software modules that are realized by the CPU 211 executing the control programs stored in the ROM 212 of the image forming apparatus 101. The web browser 300 includes a URL recognizing unit 3001, a user-agent managing unit 3002, a user-agent specifying unit 3003, and a message generating unit 3004. The web browser 300 further includes a request transmitting unit 3005, a response receiving unit 3006, a response determining unit 3007, a response outputting unit 3008, an error outputting unit 3009, a priority managing unit 3010, and a URL determining unit 3011.

The URL recognizing unit 3001 recognizes a designated specific URL. For example, if access destinations are limited by a whitelist or the like, the URL recognizing unit 3001 may determine whether the designated URL is one of the specific URLs included in the list and prompt re-designation to be carried out when the designated URL does not match the specific URLs, for example. While the URL recognizing unit 3001 need not execute any processing in particular if access destinations are not limited, the URL recognizing unit 3001 may perform processing for specifying the domain included in the designated URL, and the like.

The user-agent managing unit 3002 stores, manages, and provides a plurality of user agents. FIG. 6A is a diagram illustrating one example of a user-agent management table for managing user agents. Specifically, user agents and numbers serving as identification information (identification numbers) are stored in association with one another and managed. An identification-number column consists of unique numbers provided in order from 1, for example. A user-agent column is for holding a plurality of user agents to be set in requests transmitted by the web browser 300. The stored user agents may be set in advance to the image forming apparatus 101, or in place of or in addition to doing so, management of the user agents, such as the adding, deleting, and modifying thereof, may be performed by an administrator or the like. This management may be performed using the operation unit 219 of the image forming apparatus 101 or using a client computer connected to the image forming apparatus 101. Furthermore, when the management of user agents is performed, a list of the stored user agents may be displayed on the operation unit 219 or on the client computer.

The user-agent specifying unit 3003 selects a specific user agent. For example, the specific user agent selected by the user-agent specifying unit 3003 is one of the user agents stored in the user-agent managing unit 3002. The message generating unit 3004 generates a message in which the specific user agent selected by the user-agent specifying unit 3003 is used. The request transmitting unit 3005 acquires the message generated by the message generating unit 3004 and transmits a request to the server 102.

The response receiving unit 3006 receives a response that is returned from the server 102 and that includes web content. The response determining unit 3007 determines whether or not the response received by the response receiving unit 3006 is a response indicating the properness of the web request. For example, a response indicating the properness of a web request is a response that is returned if the server was able to interpret the web request and returns a web response in accordance with the interpretation. Conversely, the above-described improper-request response is included in a response indicating the improperness of a web request. A response indicating the properness of a web request is referred to as a normal response. Specifically, the response determining unit 3007 determines whether or not the web response is an improper-request response. In order to make this determination, for example, the response determining unit 3007 determines whether the web content included in the web response is blank. Alternatively, the response determining unit 3007 determines whether the HTTP response code is "404 Bad Request". The response determining unit 3007 may determine that the web request was an improper request and was improper if the received web content is empty or the received response code is "404 Bad Request". Note that, while only "404 Bad Request" is discussed as an error response in the present example, it is sufficient that processing be performed accordingly for other responses. Note that the web request and web response in the present embodiment may also be called an HTTP request and an HTTP response, respectively.

The response outputting unit 3008 outputs web content of the response received by the response receiving unit 3006 by passing the web content to a software module for processing the web content, such as an unillustrated display module, for example. Alternatively, processing other than display may be performed. The error outputting unit 3009 may output web content of an error response indicating that the user agent was not supported by the server via a software module for processing the web content, such as the unillustrated display module, for example.

The priority managing unit 3010 and the URL determining unit 3011 need not be included in the present embodiment, and are software modules that are necessary in the later-described second embodiment.

Request Transmission Processing

With reference to the flowchart in FIG. 4, processing will be described in which the web browser 300 of the MFP 101 in the present embodiment transmits a request addressed to a designated URL to the server 102, and re-transmits a request in accordance with a response received from the server.

Figure 4:
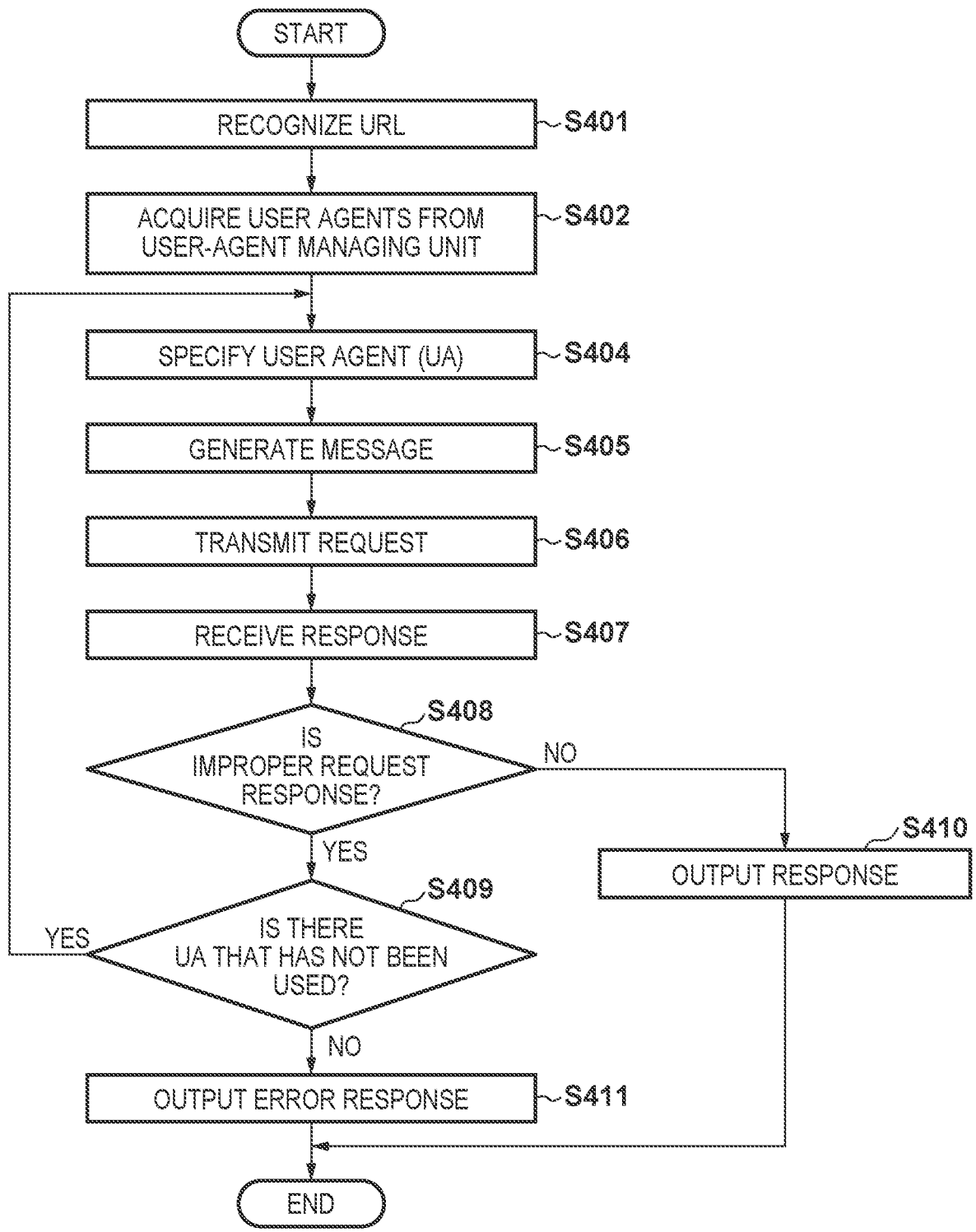
FIG. 4 is a flowchart of processing in which a response to a recognized URL is returned.

The steps illustrated in the flowchart in FIG. 4 are executed as a result of the CPU 211 of the MFP 101 deploying and executing, in the RAM 213, control programs stored in a memory such as the ROM 212.

The CPU 211 uses the URL recognizing unit 3001 to recognize a designated specific URL (step S401). Note that, in the present embodiment, CPU 211 may simply store an input URL. Note that, when "the CPU 211 uses the URL recognizing unit 3001 to . . . ", the CPU 211 realizes the URL recognizing unit 3001 by executing a program and thereby executes processing. This similarly applies to the other steps.

The CPU 211 uses the user-agent managing unit 3002 to acquire user agents registered in the user-agent management table (step S402). If a plurality of user agents are registered, the CPU 211 acquires all of the user agents.

The CPU 211 uses the user-agent specifying unit 3003 to specify one of the acquired user agents (step S404). The CPU 211 may perform the specification of a user agent in step S404 in the order of identification numbers, for example. For example, in the individual iterations of the loop from step S404 to step S409, the CPU 211 may set user agents associated with the identification numbers as a user agent of interest in the order of 1, 2, 3, . . . , and set the user agent of interest as a specific user agent.

The CPU 211 uses the message generating unit 3004 to generate a message using the user agent specified by the user-agent specifying unit 3003 (step S405). For example, the CPU 211 sets the user agent in an HTTP request header portion.

The CPU 211 uses the request transmitting unit 3005 to transmit, to the server 102, a request consisting of the message generated by the message generating unit 3004 (step S406).

The CPU 211 uses the response receiving unit 3006 to receive web content of a response returned by the server 102 (step S407).

The CPU 211 passes the web content of the received response to the response determining unit 3007 to determine whether the received response is an improper-request response, or that is, whether the received response is a response indicating the improperness of the web request (step S408). The CPU 211 transitions to step S409 upon determining that the received response is not an improper-request response and is a normal response. In step S409, the CPU 211 determines whether one or more of the user agents acquired in step S402 still have not been set as the user agent of interest. If there are one or more user agents that still have not been set as the user agent of interest, the CPU 211 branches to step S404, where one of the user agents that still have not been set as the user agent of interest is specified, and repeats processing therefrom.

Note that, upon determining in step S409 that there is already no user agent that still has not been set as the user agent of interest, the loop processing is terminated and the CPU 211 transitions to step S411 to display a response indicating an error. If the received response is a normal response, or in other words, a response indicating the properness of the web request, the CPU 211 transitions to step S410 to display the web content of the acquired response.

The CPU 211 uses the response outputting unit 3008 to output, via a software module for processing web content (e.g., the display module), the web content of the response received by the response receiving unit 3006 (step S410).

The CPU 211 uses the error outputting unit 3009 to output, to a software module for processing error responses and web content (e.g., the display module), an error response or web content thereof (step S411). The error discussed herein is an error indicating that a user agent is not supported by the server 102; however other errors may also be included.

Application Example

An application example of processing in which a response to a recognized URL is returned will be described with reference to FIGS. 6A, 7A, 7B, 7C, 7D, 8A, and 8B. In this application example, an assumption is made that, among the user agents managed by the user-agent managing unit 3002 that are illustrated in FIG. 6A, the server 102 cannot interpret the user agent 6002 but can interpret the user agent 6004. Furthermore, the designated URL is http://xxx.yyy.zzz.

The CPU 211 uses the URL recognizing unit 3001 and the web browser 300 recognizes the designated URL (step S401). Here, it is sufficient that the CPU 211 accept and store the designated URL. That is, the recognized URL may be the designated URL.

The CPU 211 uses the user-agent managing unit 3002 to acquire the user agents included in the user-agent management table (step S402).

The CPU 211 uses the user-agent managing unit 3002 to read identification numbers and the user agents associated therewith, and performs loops of processing in the order of the identification numbers (steps S404 to S409). In each processing loop, the following information is read in order.

First Loop

Identification number 6001: 1

User agent 6002: Mozilla/z.z (unique-id-xxx) BrowserEngine

In such a manner, the CPU 211 uses the user-agent specifying unit 3003 to specify the user agent 6002 associated with the identification number 6001 of interest (step S404).

The CPU 211 uses the message generating unit 3004 to generate a message in which the user agent specified by the user-agent specifying unit 3003 is used (step S405). The user agent 701 in FIG. 7A is included in the header of the request in which the specified user agent 6002 is used.

The CPU 211 uses the request transmitting unit 3005 to acquire the message generated by the message generating unit 3004 and transmit the request illustrated in FIG. 7A to the server 102 (step S406).

The CPU 211 uses the response receiving unit 3006 to receive web content of a response returned by the server 102 (step S407). In this example, the CPU 211 receives the response in FIG. 7B. This response includes the response code 702 and the web content 703.

The CPU 211 passes the web content of the received response to the response determining unit 3007 to determine whether the response is an improper-request response, or that is, whether the web content is blank, for example (step S408). The CPU 211 transitions to step S409 upon determining that the received response is an improper-request response. Note that, if there is no user agent to be set as the user agent of interest and the loop processing is terminated, the CPU 211 transitions to step S411 to process a response indicating an error, or that is, to display a response indicating an error, for example. If the content is not blank, the CPU 211 transitions to step S410 to display the acquired response.

Upon receiving the response in FIG. 7B, the CPU 211 transitions to step S409, determining that the response is an improper-request response because the web content 703 is blank. Alternatively, the CPU 211 may transition to step S409, determining that the response is an improper-request response because the response code 702 is "404 Bad request".

If there are any unprocessed user agents, the CPU 211 transitions from step S409 to step S404 and processes the second loop. In the user-agent management table in FIG. 6A, the user agent identified by identification number 2 is still remaining unprocessed. Thus, the CPU 211 uses the user-agent managing unit 3002 to read the identification numbers and the user agents, and performs loops of processing in the order of the identification numbers (steps S404 to S409).

Second Loop

The identification number and the user agent associated therewith that the CPU 211 reads from the user-agent management table in the second loop are as follows.

Identification number 6003: 2

User agent 6004: Mozilla/z.z (iPhone (registered trademark)) BrowserEngine

The CPU 211 uses the user-agent specifying unit 3003 to specify the user agent 6004 associated with identification number 2 (step S404).

The CPU 211 uses the message generating unit 3004 to generate a message in which the user agent specified by the user-agent specifying unit 3003 is used (step S405).

Figure 7C:
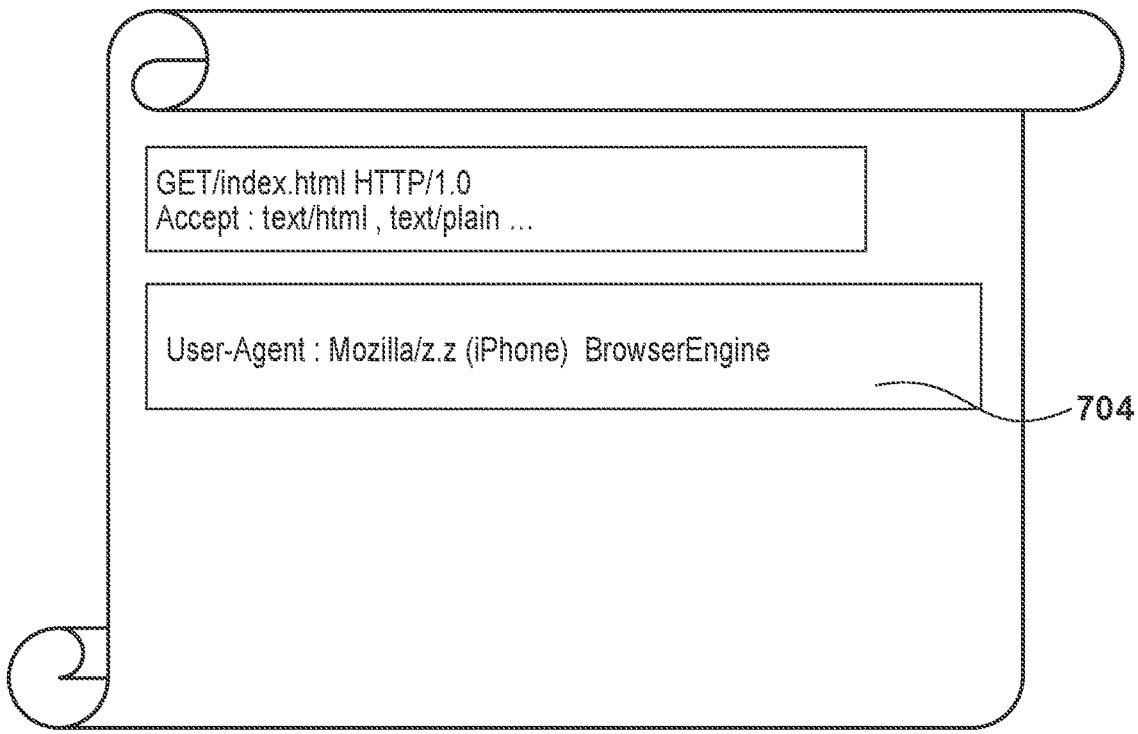
FIG. 7C is an image diagram of a request.

The user agent 704 in FIG. 7C is included in the header of the request in which the specified user agent 6004 is used.

The CPU 211 uses the request transmitting unit 3005 to acquire the message generated by the message generating unit 3004 and transmit the request illustrated in FIG. 7C to the server 102 (step S406).

The CPU 211 uses the response receiving unit 3006 to receive web content of a response returned by the server 102 (step S407). In this example, the CPU 211 receives the response in FIG. 7D. This response includes web content 705.

The CPU 211 passes the web content of the received response to the response determining unit 3007 to determine whether the response is an improper-request response, or that is, whether the web content is blank, for example (step S408). The CPU 211 transitions to step S409 upon determining that the received response is an improper-request response. Note that, if there is no user agent to be set as the user agent of interest and the loop processing is terminated, the CPU 211 transitions to step S411 to process a response indicating an error, or that is, to display a response indicating an error, for example. If the response is not an improper-request response, or that is, if the response is a normal response, the CPU 211 transitions to step S410 to display the acquired response.

Figure 7D:
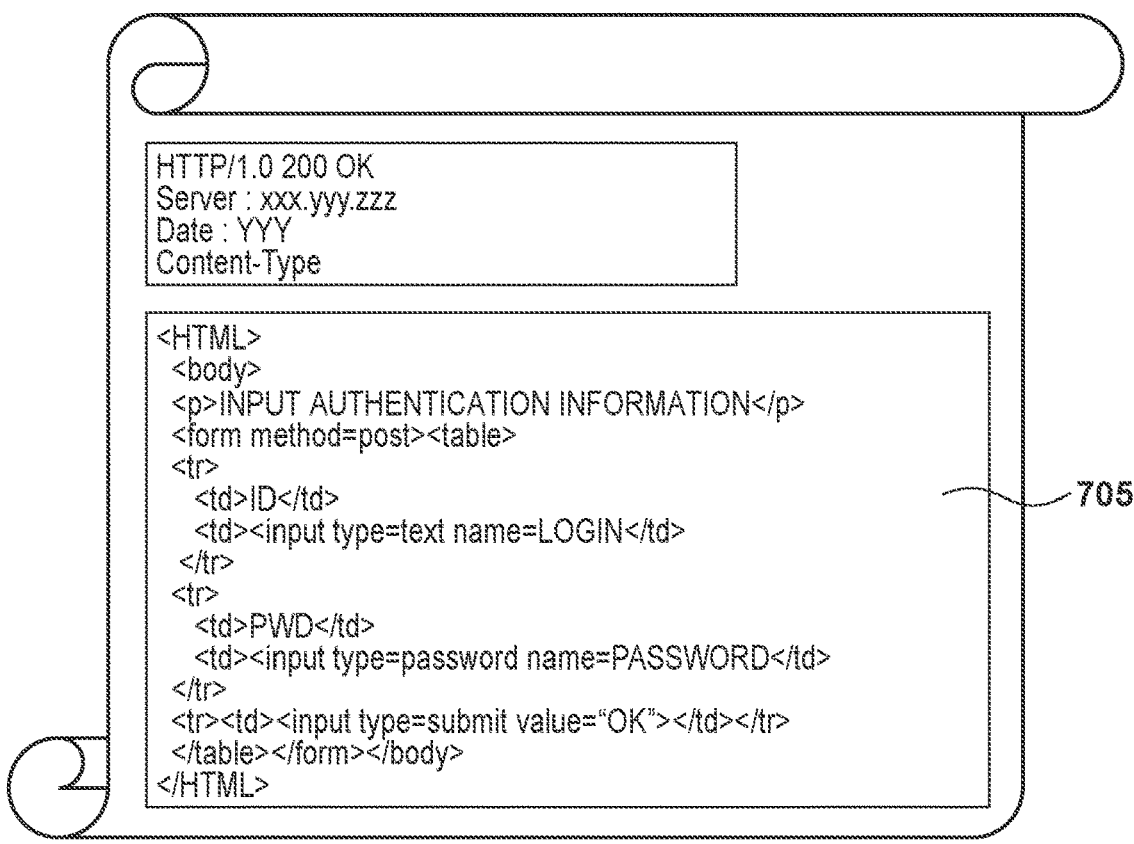
FIG. 7D is a diagram illustrating one example of a response.

Upon receiving the response in FIG. 7D, the CPU 211 transitions to step S410 because the web content 705 is not blank.

Figure 8B:
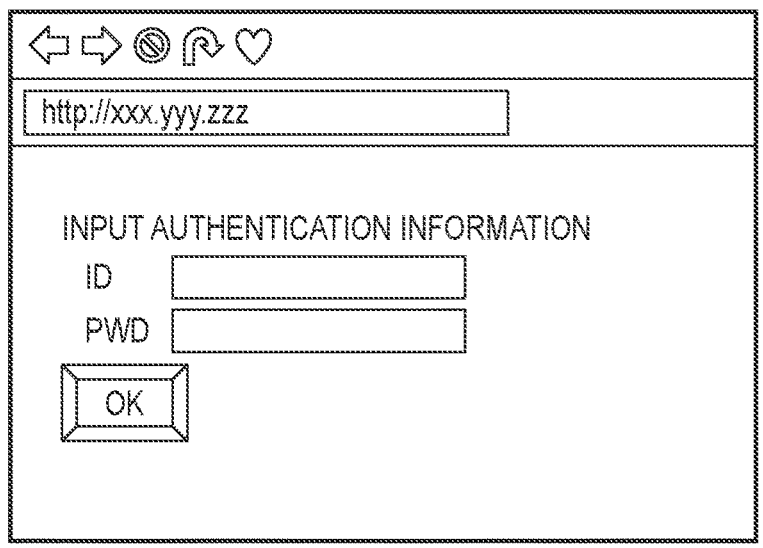

The CPU 211 uses the response outputting unit 3008 to output the web content of the response received by the response receiving unit 3006 to a software module for processing the web content, or that is, a software module for displaying the web content, for example (step S410). FIG. 8B illustrates an example of the output in step S410. FIG. 8B is a diagram illustrating one example in which the display module having been passed the web content, or that is, the web browser 300, displays the rendering result of the response on the liquid-crystal display unit, and indicates that a screen that can be operated by the user is displayed. Note that, in a case in which display is to be performed, the display can be realized by the response outputting unit 3008 passing the display-target web content as parameters to a display interface provided by the OS, for example.

Figure 8C:

Note that the CPU 211 uses the error outputting unit 3009 to return web content of an error response indicating that the user agent was not supported by the server 102 (step S411). A case in which none of the user agents detected in the user-agent management table could be interpreted by the server ends up in an error. FIG. 8C is a diagram illustrating one example in which the web browser 300 displays, on the liquid-crystal display unit, a rendering result of an error response.

As described above, according to the present embodiment, the web browser 300 transmits requests, reattempting to access the server using a plurality of user agents in order. Thus, the compatibility between the web browser and the server can be maintained as much as possible, and the user can transition between screens due to an increase in opportunities in which displayable web content can be acquired from the server. Accordingly, the effect of improving usability is achieved.

Second Embodiment

In the present embodiment, upon transmitting a request to a connection destination from which content has already been acquired, the web browser 300 transmits a request preferentially using a user agent with which content acquisition was successful. The web browser 300 acquires displayable web content in such a manner. The differences between the present embodiment and the first embodiment will be described.

The priority managing unit 3010 in FIG. 3 stores and manages one or more URLs from which web content has been acquired and one or more user agents associated with the URLs. If a URL to be stored is already stored, the priority managing unit 3010 overwrites the user agent associated with the URL with a new user agent. The priority managing unit 3010 provides the managed URLs and user agents. FIG. 6B is a diagram illustrating one example of a priority management table managed by the priority managing unit 3010. Specifically, "http://xxx.yyy.zzz" is stored as a URL, and "Mozilla/z.z (iPhone) BrowserEngine" is stored as a user agent in association with the URL.

The URL determining unit 3011 determines whether the URL recognized by the URL recognizing unit 3001 matches a URL stored by the priority managing unit 3010. The URL determining unit 3011 may directly perform the determination on an input URL. If URLs match, the URL determining unit 3011 returns, to the requester, the matching URL and the user agent associated with the URL. If URLs do not match, the URL determining unit 3011 returns information indicating that URLs do not match, or that is, returns null, for example.

For example, the user-agent specifying unit 3003 requests the URL determining unit 3011 to search for the input URL, and obtains the corresponding URL and user agent. Furthermore, the user-agent specifying unit 3003 recognizes, as the user agent corresponding to the specific URL (i.e., the URL selected from the priority management table), the user agent acquired from the priority managing unit 3010.

Request Transmission Processing

With reference to the flowchart in FIG. 5, processing will be described in which the web browser 300 of the MFP 101 in the present embodiment transmits a request addressed to a designated URL to the server 102, and re-transmits a request in accordance with a response received from the server.

Figure 5:
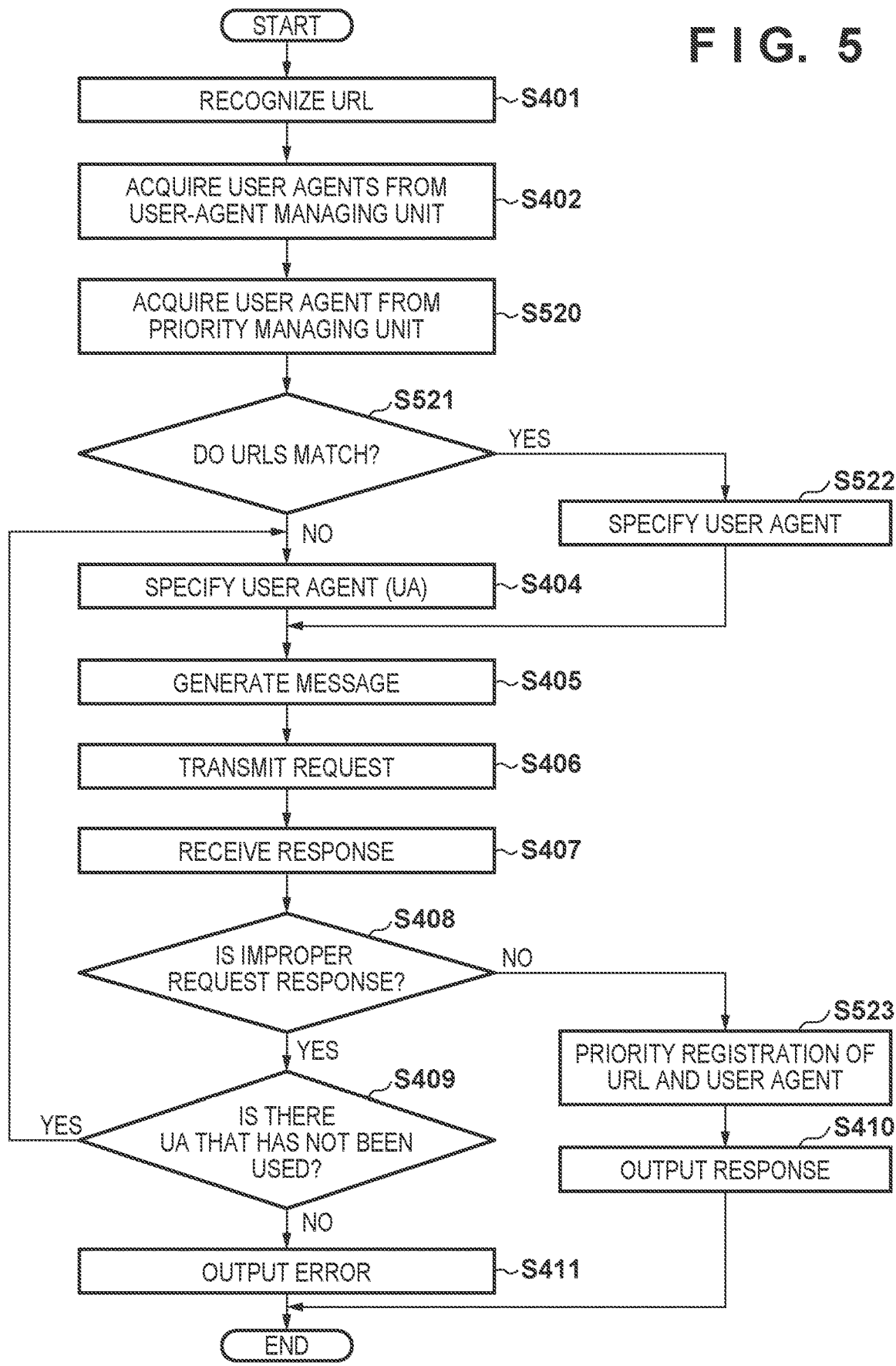
FIG. 5 is a flowchart of processing in which a response to a recognized URL is returned.

The steps illustrated in the flowchart in FIG. 5 are executed as a result of the CPU 211 of the MFP 101 deploying and executing, in the RAM 213, control programs stored in a memory such as the ROM 212.

The CPU 211 uses the priority managing unit 3010 to acquire one or more URLs and one or more user agents (step S520). Here, the CPU 211 acquires all sets of a URL and a user agent stored by the priority managing unit 3010.

The CPU 211 uses the URL determining unit 3011 to determine whether the designated URL matches a URL acquired from the priority managing unit 3010 (step S521). If there is a matching URL, the CPU 211 transitions to step S522. If URLs do not match, the CPU 211 transitions to step S404.

The CPU 211 uses the user-agent specifying unit 3003 to specify, from among the URLS and user agents acquired from the priority managing unit 3010, a user agent corresponding to the URL determined in step S521 as matching the designated URL (step S522). That is, a user agent associated with the designated URL is specified.

The CPU 211 branches to step S523 upon determining that the response received in step S408 is not an improper-request response, or that is, that the response code is not 404 or the web content accompanying the response is not blank. Here, the CPU 211 uses the priority managing unit 3010 to register the URL of the transmission destination of the web request transmitted in step S406 and the user agent included in the header of the web request in association with one another (step S523). Note that, if URLs overlap, the CPU 211 performs registration by overwriting.

Through such a procedure, if a web request is successful, the URL and the user agent in the web request are stored in association with one another for later. Furthermore, when a new web request addressed to the stored URL is to be transmitted, the user agent stored in association with the URL is also used in the new web request. Thus, situations in which the server does not accept web requests due to user agents can be reduced.

Application Example

An application example of processing in which a response to a recognized URL is returned will be described with reference to FIGS. 6B, 7C, 7D, and 8B. In this application example, an assumption is made that, among the user agents that are managed by the user-agent managing unit 3002, the server 102 cannot interpret the user agent 6002 but can interpret the user agent 6004. Furthermore, the designated URL is http://xxx.yyy.zzz.

An assumption is made that the priority managing unit 3010 has already registered the URL 6006 and the user agent 6007 that were successful in the reattempt (see FIG. 6B).

Steps S401 and S402 are omitted due to being the same as those in the application example of the first embodiment.

The CPU 211 uses the priority managing unit 3010 to acquire one or more URLs and one or more user agents (step S520). Here, the CPU 211 acquires the set of a URL and a user agent illustrated in FIG. 6B.

The CPU 211 uses the URL determining unit 3011 to determine whether the designated URL matches a URL acquired from the priority managing unit 3010 (step S521). The URL recognized by the URL recognizing unit 3001 is "http://xxx.yyy.zzz", and matches the URL 6006 "http://xxx.yyy.zzz" acquired from the priority managing unit 3010. Thus, the CPU 211 specifies the matching URL "http://xxx.yyy.zzz" and transitions to step S522.

The CPU 211 uses the user-agent specifying unit 3003 to specify, from among the URLs and user agents acquired from the priority managing unit 3010, a user agent corresponding to the URL specified in step S521 (step S522). The specified URL is "http://xxx.yyy.zzz", and the user agent corresponding to this URL is "Mozilla/z.z (iPhone (registered trademark)) BrowserEngine" 6007; thus, this user agent is specified.

Next, the CPU 211 transitions to step S405. The CPU 211 uses the message generating unit 3004 to generate a message in which the user agent specified by the user-agent specifying unit 3003 is used (step S405). In the message 704 in FIG. 7C, the specified user agent 6004 is used.

The CPU 211 uses the request transmitting unit 3005 to acquire the message generated by the message generating unit 3004 and transmit a request to the server 102 (step S406). In this example, the CPU 211 transmits the web request in FIG. 7C.

The CPU 211 uses the response receiving unit 3006 to receive a web response that is returned by the server 102 and accompanied by web content (step S407). In this example, the CPU 211 receives the response in FIG. 7D.

The CPU 211 passes the received web response accompanied by web content to the response determining unit 3007 to determine whether the response is an improper-request response (step S408). Upon determining that the response is an improper-request response, the CPU 211 transitions to step S409 to continue the loop processing. Note that, if the loop processing is terminated, the CPU 211 transitions to step S411 to display a web response indicating an error. If the response is not an improper-request response, the CPU 211 transitions to step S523 to display the acquired web response. In this example, the CPU 211 transitions to step S523 because the web response 705 in FIG. 7D is not blank.

The CPU 211 uses the priority managing unit 3010 to register the URL to which the transmitted web request was addressed and the user agent used in the web request (step S523). Note that, if URLs overlap, the CPU 211 performs registration by overwriting.

Here, the registered URL is "http://xxx.yyy.zzz", and the registered user agent is "Mozilla/z.z (iPhone (registered trademark)) BrowserEngine" 6007. Note that, in the present application example, registration is performed by overwriting because the URL 6006 and the user agent 6007 are already registered and overlap.

The CPU 211 uses the response outputting unit 3008 to return the web-content response received by the response receiving unit 3006 (step S410). An example of this is FIG. 7D.

FIG. 8B is a diagram illustrating one example of a screen obtained by the web browser 300 displaying, on the liquid-crystal display unit, a rendering result of a web response.

According to the present embodiment, as a result of the web browser 300 transmitting a web request preferentially using a user agent with which the acquisition of a web response was successful, the occurrence of a situation in which displayable web content cannot be acquired can be suppressed. Accordingly, the effect of improving processing efficiency is achieved.

Modification

In the first and second embodiments, the user agents stored by the user-agent managing unit 3002 are either directly managed from the image forming apparatus 101 or managed from a client computer connected to the image forming apparatus 101. Here, if management can be performed from a client computer connected to the image forming apparatus 101, the image forming apparatus 101 includes a server module. In view of this, if a request (e.g., an HTTP request) including a user agent is made from the client and the request is acceptable, the user agent included in the request may be copied and stored in the user-agent managing unit 3002. By adopting such a configuration, user agents can be registered after being filtered by the image forming apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179091, filed Nov. 8, 2022, which is hereby incorporated by reference herein in its entirety.

What is claimed is:

1. An information processing apparatus that transmits requests to a server and receives responses to the requests, the information processing apparatus comprising: at least one memory storing at least one program; and at least one processor, the at least one program causing the at least one processor to: store a plurality of pieces of transmission-source information including first transmission-source information and second transmission-source information, and information relating to an order of the plurality of pieces of as transmission-source information; transmit, to the server, a request in which the first transmission-source information included in the plurality of pieces of transmission-source information stored is set according to the information relating to the order; receive a response to the request from the server; and in a case where a response indicating improperness of the request is received from the server in response to the request, transmit, to the server, a request in which, the second transmission-source information, is set as the transmission-source information according to the information relating to the order,
wherein the plurality of pieces of transmission-source information further includes third transmission-source information, and the at least one program causes the at least one processor to: in a case where a response indicating improperness of the request in which the second transmission source information is set as the transmission-source information is received, transmit, to the server, a request in which the third transmission source information is set as the transmission-source information according to the information relating to the order.

2. The information processing apparatus according to claim 1,
wherein the at least one program causes the at least one processor to:
in a case where a response indicating the properness of the request is received from the server in response to the request, store the transmission-source information set in the request in association with a transmission destination of the request; and
in a case where the transmission destination of the request is a stored transmission destination, transmit the request in which the transmission-source information stored in association with the transmission destination is set as the transmission-source information.

3. The information processing apparatus according to claim 2,
wherein, in a case where the transmission destination of the request that is to be stored is already stored in association with the transmission-source information, the transmission-source information and the transmission destination of the request that are already stored are overwritten.

4. The information processing apparatus according to claim 1,
wherein the response indicating the improperness of the request is a response accompanied by blank content.

5. The information processing apparatus according to claim 1,
wherein an error is output in a case where the response indicating the improperness of the request is received from the server in response to all of the requests in which the one or more stored pieces of transmission-source information have been set.

6. The information processing apparatus according to claim 1,
wherein, in a case where a response indicating the properness of the request is received from the server in response to the request in which one of the one or more stored pieces of transmission-source information has been set, content received together with the response is output.

7. The information processing apparatus according to claim 1,
wherein the at least one program causes the at least one processor to:
receive the request from an external apparatus connected to the information processing apparatus, and store the transmission-source information included in the request.

8. The information processing apparatus according to claim 1,
wherein the request is an HTTP request, and the transmission-source information is a user agent included in the HTTP request.

9. A non-transitory computer readable medium storing thereon a program which, when loaded into a computer and executed, causes the computer to operate as an information processing apparatus that transmits requests to a server and receives responses to the requests, the program causing the computer to: store a plurality of pieces of transmission-source information including first transmission-source information and second transmission-source information, and information relating to an order of the plurality of pieces of transmission-source information; transmit, to the server, a request in which the first transmission-source information included in the plurality of pieces of transmission-source information stored is set according to the information relating to the order; receive a response to the request from the server; and in a case where a response indicating improperness of the request is received from the server in response to the request, transmit, to the server, a request in which, the second transmission-source information, is set as the transmission-source information according to the information relating to the order,
wherein the plurality of pieces of transmission-source information further includes third transmission-source information, and the at least one program causes the at least one processor to: in a case where a response indicating improperness of the request in which the second transmission source information is set as the transmission-source information is received, transmit, to the server, a request in which the third transmission source information is set as the transmission-source information according to the information relating to the order.

10. An information processing method in which requests are transmitted to a server and responses to the requests are received by an information processing apparatus, wherein the information processing apparatus: stores a plurality of pieces of transmission-source information including first transmission-source information and second transmission-source information, and information relating to an order of the plurality of pieces of as transmission-source information; transmits, to the server, a request in which the first transmission-source information included in the plurality of pieces of transmission-source information stored is set according to the information relating to the order; receives a response to the request from the server; and in a case where a response indicating improperness of the request is received from the server in response to the request, transmits, to the server, a request in which, the second transmission-source information, is set as the transmission-source information according to the information relating to the order,
wherein the plurality of pieces of transmission-source information further includes third transmission-source information, and the at least one program causes the at least one processor to: in a case where a response indicating improperness of the request in which the second transmission source information is set as the transmission-source information is received, transmit, to the server, a request in which the third transmission source information is set as the transmission-source information according to the information relating to the order.

* * * * *